United States Patent [19]
Gazsi et al.

[11] Patent Number: 5,204,831
[45] Date of Patent: Apr. 20, 1993

[54] CIRCUIT CONFIGURATION FOR DIGITAL BIT-SERIAL SIGNAL PROCESSING

[75] Inventors: Lajos Gazsi, Düsseldorf, Fed. Rep. of Germany; Peter Caldera, Villach, Austria

[73] Assignee: Siemens Aktiengesellschaft, Munich, Fed. Rep. of Germany

[21] Appl. No.: 805,584

[22] Filed: Dec. 11, 1991

[30] Foreign Application Priority Data
Dec. 11, 1990 [EP] European Pat. Off. ........ 90123865.9

[51] Int. Cl.⁵ .......................... G06F 7/50; G06F 7/31
[52] U.S. Cl. .................................. 364/785; 364/724.14
[58] Field of Search .......................... 364/785, 724.14

[56] References Cited
U.S. PATENT DOCUMENTS

| 3,941,990 | 3/1976 | Rabasse ................. 364/785 |
| 4,285,047 | 8/1981 | Ohnishi ................. 364/785 |
| 4,336,600 | 6/1982 | Houdard et al. ......... 364/785 |
| 4,774,686 | 9/1988 | McClary et al. ......... 364/785 X |

FOREIGN PATENT DOCUMENTS
0238300 9/1987 European Pat. Off.

OTHER PUBLICATIONS
Motorola, AN-286, Appl. Note Integrated Circuits, Renschler et al: "Binary Addition Using MRTL Integrated Circuits", 1967, USA.

Primary Examiner—Tan V. Mai
Attorney, Agent, or Firm—Herbert L. Lerner; Laurence A. Greenberg

[57] ABSTRACT

A circuit configuration for digital bit-serial signal processing includes n input shift registers each being written in parallel or serially with an input data word and then read out by shifting to the right. Sign repetition devices are each assigned to a respective one of the input shift registers for continuously generating and shifting an algebraic sign of the input data word onward in the shift to the right. A serial arithmetic unit is connected downstream of the input shift registers for serially outputting output data words. m output shift registers connected downstream of the serial arithmetic unit are written in serially with the output data words and read out in parallel and/or serially. A control unit is connected to the serial arithmetic unit. Once all of the output data words have been fully written in the respective output shift registers, the control unit ends a readout of the input shift registers and the writing in of the output shift registers, for bringing the arithmetic unit to a defined initial state, and for enabling the input shift registers for writing in new input data words.

12 Claims, 2 Drawing Sheets

CIRCUIT CONFIGURATION FOR DIGITAL BIT-SERIAL SIGNAL PROCESSING

BACKGROUND OF THE INVENTION

1. Field of the Invention

The invention relates to a circuit configuration for digital bit-serial signal processing.

Bit-serial processing of time and amplitude-discrete data is intrinsically superior in various aspects to bit-parallel processing. Only a few connections and leads are necessary for bit-serial processing, and the total expenditure for data processing circuitry is also low. The expenditure increases with the word length of the data to a much lesser extent than is the case with bit-parallel processing. The data flow is also markedly higher. Such characteristics are highly advantageous above all for realizations in very large scale integration technology, since they make very compact and effective topologies possible.

However, in bit-serial processing, a very high expenditure for circuitry is necessary both for controlling and in particular for equalizing the transit time for various data paths and for processing the algebraic sign. A further factor is a long overall processing time. Above all, in bit-serial configurations that have feedbacks, such as recursive digital filters in general and wave digital filters in particular, or those that operate by time multiplexing, the circuitry expenditure and processing times are multiplied. As a result, bit-parallel processing has thus far predominantly been preferred over bit-serial processing.

SUMMARY OF THE INVENTION

It is accordingly an object of the invention to provide a circuit configuration for digital bit-serial signal processing, which overcomes the hereinafore-mentioned disadvantages of the heretofore-known devices of this general type and in which the circuitry expenditure is low and the signal processing time is short.

With the foregoing and other objects in view there is provided, in accordance with the invention, a circuit configuration for digital bit-serial signal processing, comprising n input shift registers each being written in parallel or serially with an input data word and then read out by shifting to the right, sign repetition devices each being assigned to a respective one of the input shift registers for continuously generating and shifting an algebraic sign of the input data word onward in the shift to the right; a serial arithmetic unit connected downstream of the input shift registers for serially outputting output data words; m output shift registers connected downstream of the serial arithmetic unit being written in serially with the output data words and read out in parallel and/or serially; and a control unit connected to the serial arithmetic unit, once all of the output data words have been fully written in the respective output shift registers, the control unit ending a readout of the input shift registers and the writing in of the output shift registers, for bringing the arithmetic unit to a defined initial state, and for enabling the input shift registers for writing in new input data words.

In accordance with another feature of the invention, there are provided k feedback shift registers each being written-in in parallel with data words stored in the output shift registers and being read out serially for a further transmission of the data word to the arithmetic unit, and other sign repetition devices assigned to the feedback shift registers for continuously generating and shifting the algebraic sign of the data words onward.

In accordance with a further feature of the invention, there are provided feedback shift registers into which data words being transferred from the arithmetic unit and supplied back to the arithmetic unit are written in serially by shifting to the right and simultaneously read out, other sign repetition devices assigned to the feedback shift registers, and a multiplexer connected upstream of the feedback shift registers being imposed upon the other sign repetition devices and subsequently upon the arithmetic unit, upon writing in of the respective feedback shift registers for a certain number of least significant bits of the data words to be transferred, and signs generated and shifted onward by the other sign repetition devices being equal to signs of the data words to be read out.

In accordance with an added feature of the invention, the feedback shift register has a length greater than or equal to the length of the longest occurring data word.

In accordance with an additional feature of the invention, the writing in and reading out of the feedback shift registers is effected synchronously with the writing in and reading out of the input shift registers.

In accordance with yet another feature of the invention, the reading out of the feedback shift registers is effected in synchronism with the reading out of the input shift register.

In accordance with yet a further feature of the invention, the feedback shift registers and the output shift registers are lengthened by one or more bits for overflow monitoring.

In accordance with yet an added feature of the invention, all of the places of the feedback shift register are set equal to zero, at the defined initial state.

In accordance with yet an additional feature of the invention, the arithmetic unit has at least one full adder to which data words are input serially and from which data words are output serially, the at least one full adder having a transmission output and a transmission input, and including a register coupling the transmission output and transmission input of the full adder to one another, the register having an input side occupied by a logical zero at the defined initial state.

In accordance with again another feature of the invention, the arithmetic unit has at least one full adder to which data words are input serially and from which data words are output serially, the at least one full adder having an input, a transmission output and a transmission input, and including an inverter connected upstream of the input of the at least one full adder, and a register coupling the transmission output and the transmission input of the at least one full adder to one another, the register having an input side being occupied by a logical one at a defined initial state.

In accordance with again a further feature of the invention, the arithmetic unit has at least one full adder with inputs, and including one or more delay element coupling one of the inputs to another of the inputs of the at least one full adder.

In accordance with again an added feature of the invention, there is provided a monitoring device connected to the output shift registers for checking the output data word as to whether a given values region has been adhered to, for passing on the output data word if the values region is adhered to, and for setting the output data word to a maximum value maintaining the same algebraic sign if the values region is not adhered to.

In accordance with a concomitant feature of the invention, the length of the output data word is shortened by the monitoring device.

Other features which are considered as characteristic for the invention are set forth in the appended claims.

Although the invention is illustrated and described herein as embodied in a circuit configuration for digital bit-serial signal processing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

A circuit configuration according to the invention generally includes n input shift registers, each of which is written in parallel or serially with an input data word and then read out serially by a shift to the right. There are n sign repetition devices, each being assigned to the input shift registers, which continuously generate the applicable sign and shift it onward in the shift of the input data words to the right. There are n output shift registers, into which output data words or data words are written serially by shifting to the right and which are read out in parallel and/or serially. There are k feedback shift registers, into which the data words are written in parallel and which are then read out serially by shifting to the right. There are k sign repetition devices assigned to the feedback shift registers. An arithmetic unit is also provided.

Figure 1:
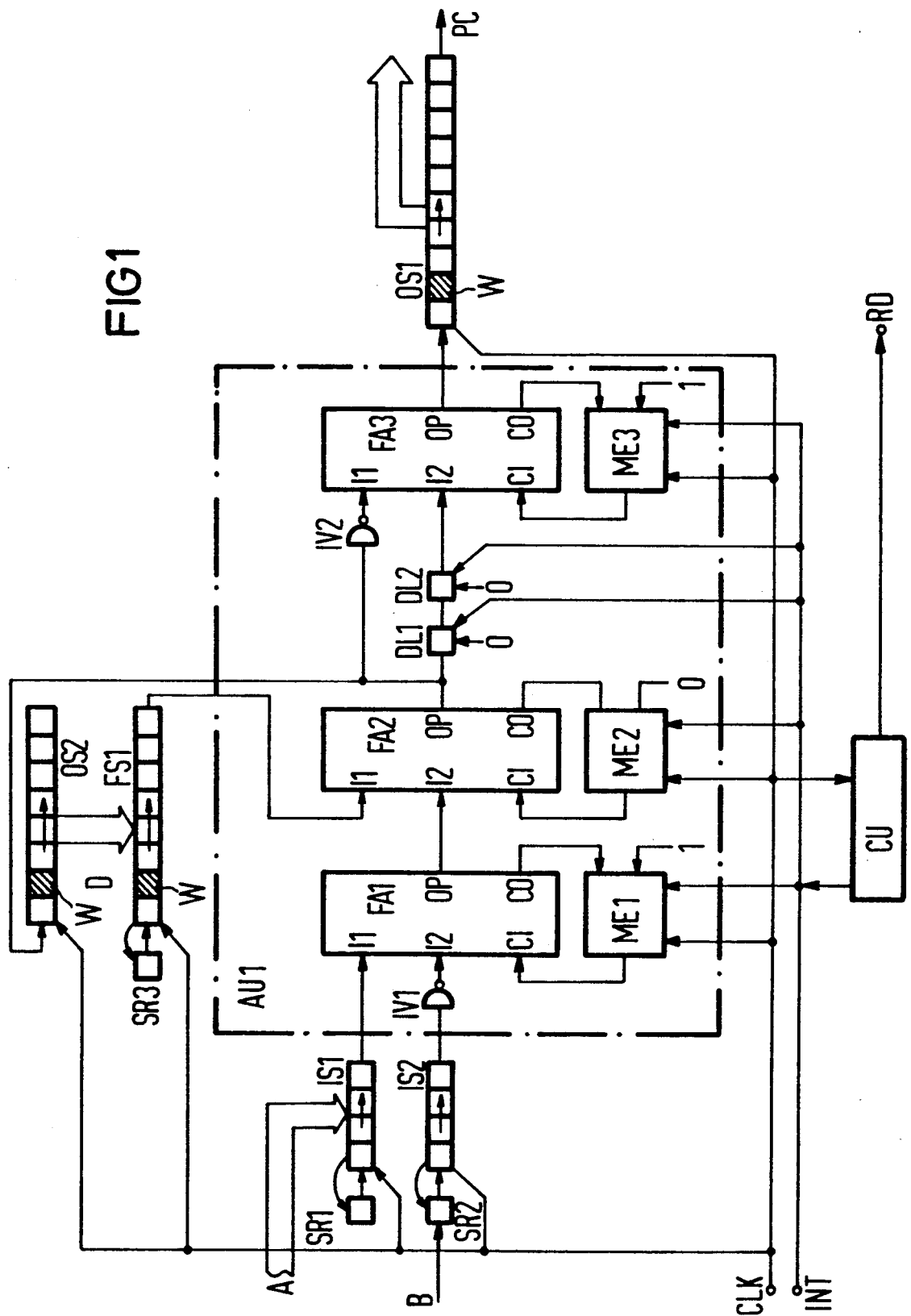
FIG. 1 is a block circuit diagram of a first exemplary embodiment of a circuit configuration according to the invention.

Referring now to the figures of the drawing in detail and first, particularly, to FIG. 1 thereof, there is seen an exemplary embodiment in which two input shift registers IS1 and IS2 are provided. The input register IS1 is written in parallel with an input data word A, through a parallel bus that is not specifically identified, and the input shift register IS2 is written serially with an input data word B, through a serial bus, that is likewise not specifically identified. Outputs of the two input shift registers IS1 and IS2 are connected to inputs of an arithmetic unit AU1. A further input of the arithmetic unit AU1 is connected to an output of a feedback shift register FS1, to which another algebraic sign repetition device SR3 is also assigned. The feedback shift register FS1 is coupled to an output shift register OS2 through a parallel connection. The output shift register OS2 is connected in turn to an output of the arithmetic unit AU1, from which it serially accepts a data word D, which it transfers in parallel to the feedback shift register FS1 at a given instant. An output shift register OS1 is connected to a further output of the arithmetic unit AU1. An output data word C is read serially into the output shift register OS1 and is read out in parallel or serially through a parallel or serial bus, that is not specifically identified. A control unit CU which is also provided, receives a clock signal CLK and outputs both an initializing signal INT and a signal RD for releasing the output data word C.

The arithmetic unit AU1 has three full adders FA1, FA2 and FA3, in which a transmission output CO and a transmission input CI are coupled to one another in each case through a respective register ME1, ME2 and ME3, which is constructed, for instance, as a D flip-flop or a master-slave flip-flop. In the case of the full adder FA1, one input I1 is connected directly to the output of the input shift register IS1, and another input I2 is connected to the output of the output shift register IS2 through an inverter IV1. The output of the full adder FA1 is wired to the other input I2 of the full adder FA2, while the one input I1 thereof is connected to the output of the feedback shift register FS1. In the full adder FA3, the one input I1 is connected in series with the output OP of the full adder FA2 through an inverter IV2 and the other input I2 is connected in series with the output OP of the full adder FA2 with the interposition of two delay elements DL1 and DL2, to which the input of the output shift register OS2 is also connected. The output OP of the full adder FA3 is connected to the input of the output shift register OS1.

Before two input data words A and B are written into the input shift registers IS1 and IS2, the arithmetic unit AU1 is reset, or in other words it is put into a defined initial state. To this end, all of the registers and delay elements ME1, ME2, ME3 and DL1, DL2 contained in the arithmetic unit AU1 are each set to a certain logic state, upon the appearance of the initializing signal INT. In the exemplary embodiment shown, the delay elements DL1 and DL2 and the register ME2 are set equal to a logical zero for this purpose, and the registers ME1 and ME3 are set equal to a logical one. The input shift registers IS1 and IS2, the feedback shift register FS1 and the output shift registers OS1 and OS2 can likewise be set equal to a logical zero, for example. However, this is fundamentally unnecessary, since these registers can readily be rewritten.

Once the defined initial state has been set, the two input data words A and B are written in parallel or serially into the corresponding input shift registers IS1 and IS2. In the exemplary embodiment shown, the input data words include three bits for the absolute value and one algebraic sign bit. The least significant bit is written all the way to the right and the algebraic sign bit all the way to the left in the applicable input shift register. Next the input shift registers IS1 and IS2 are read out by shifting to the left. All of the shift operations and all of the memorizing and delaying operations are done under time clock control. To this end, the clock signal CLK is supplied to the various elements. The sign bit is also delivered to a sign repetition device SR1 or SR2 assigned to the applicable input shift register IS1 or IS2. The sign repetition device generates the algebraic sign bit continuously during the shift operation and shifts it into the algebraic sign position that becomes free in the operation.

In the arithmetic unit AU1, the input data word B is subtracted serially from the input data word A. The full adder FA1, the inverter IV1 and the register ME1, which is occupied by a logical one as the initial state, are provided as a subtraction device. The difference between the two input data words A and B is added to the data word D read out serially from the feedback register FS1, by means of the full adder FA2 and the register ME2, that is occupied by a logical zero as its initial state, as an adding device. At the instant at which the input data words A and B are written into the corresponding input shift register IS1 and IS2, the data word D is transferred in parallel from the output shift register OS2 to the feedback shift register FS1. The feedback shift register FS1 is then read out serially by shifting to the right, in synchronism with the two input shift registers IS1 and IS2. The sign is likewise generated continuously and shifted onward by the sign repetition device SR3. The data word at the output of the full adder FA2, that is the data word D, is written serially under clock control and synchronously with the input shift registers IS1 and IS2 and with the feedback shift register FS1. If the writing of the data words A and B into the input shift registers IS1 and IS2 or of the data word D into the feedback shift register FS1 takes place at certain times, for instance at certain sampling times of a given signal, then the previous data word D is subsequently added to the difference between the current input data words A and B. The sum then forms the current data word D. A time-discrete integration performance is the result, which is based on the feedback, and delayed by one sampled value.

The result of integration is then multiplied with a constant factor which may equal three, for instance, by means of the following full adder FA3 and the register ME3, the inverter IV2, and the two delay elements DL1 and DL2. The full adder FA3 in combination with the inverter IV2 and the register ME3, that is occupied by a logical one as its initial state, fundamentally form a subtractor. The delay elements DL1 and DL2, that are occupied by a logical 0 as the initial state, effect a multiplication by four. Accordingly, the data word D is multiplied by 4−1, or in other words by 3. The result of this multiplication by a constant factor 3 produces the output data word C, having a value region which is increased by three times as compared with the data word D. For this reason, the output shift register OS1 is also lengthened by two bits as compared with the output shift register OS2. The output shift register OS2 and the feedback shift register FS1 are four bits longer than the two input shift registers IS1 and IS2. In the present exemplary embodiment, it should be assumed that in the least favorable case, the continuous integration of the difference between the input data words A and B multiplies the value region by eight times, resulting in a lengthening of the output shift register OS2 and the feedback shift register FS1 by three bits. A further bit W is additionally provided in these shift registers, as in the output shift register OS1, for monitoring the most significant bit and thus for detecting any possible overflow. If the predetermined value region is exceeded, this place of the applicable shift register, which is disposed between the algebraic sign and the most significant bit, is written and then represents the most significant amount bit, which can then be retrieved for further evaluation, for example.

Once the output data word C has been completely written in the output shift register OS1, the output data word C is read out in parallel and serially, and the arithmetic unit AU1 is put in the defined initial state by means of the signal INT.

Figure 2:
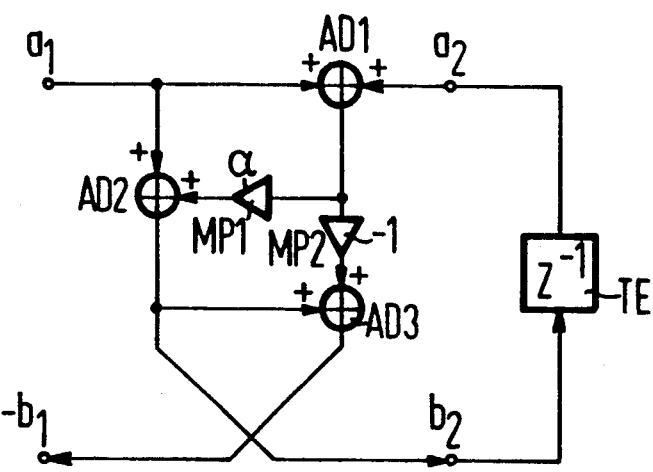
FIG. 2 is a schematic and block circuit diagram showing the structure of a given wave digital filter.

A preferred field of application for circuit configurations according to the invention is that of digital filters, in particular wave digital filters. FIG. 2 of the drawing shows an embodiment of a structure of a given wave digital filter. A first input signal $a_1$ is carried firstly to one input of a first adder AD1, having another input which is occupied by a second input signal $a_2$. The input signal $a_1$ is carried secondly to one input of a second adder AD2, having another input which is occupied by an output signal of the first adder AD1, that is multiplied by a constant factor $\alpha$ by means of a first multiplier MP1, wherein the factor $\alpha$ is selected to be equal to $-0.34375$. The output signal of the first adder AD1 is connected to one input of a third adder AD3, and is inverted by a second multiplier MP2. Another input of the third adder AD3 is acted upon by an output signal of the second adder AD2. An output of the third adder AD3 carries a first output signal $-b_1$, and the output of the second adder AD2 carries a second output signal $b_2$. The second input signal $a_2$ is the second output signal $b_2$, delayed by a sampled value. The delay of the second output signal $b_2$ by one sampled value is effected with a delay element TE.

Figure 3:
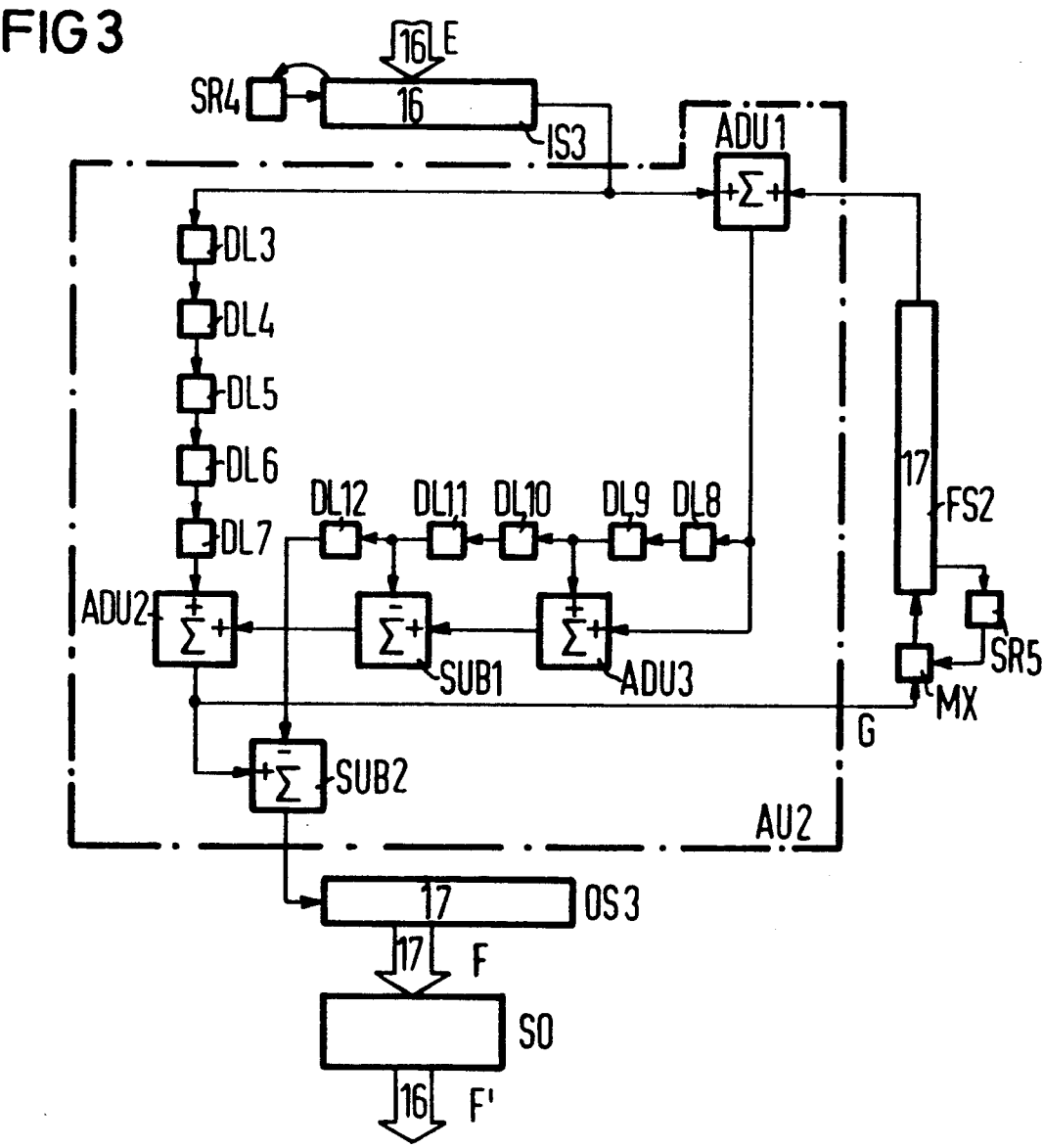
FIG. 3 is a block circuit diagram showing the realization of the wave digital filter of FIG. 2 by means of a circuit configuration according to the invention.

In FIG. 3 of the drawing, a realization of the wave digital filter of FIG. 2 by means of a circuit configuration according to the invention is shown. The first input signal $a_1$ is given by an input data word E, which is written in parallel into an input shift register IS3 at each sampling time. The input data word E and all of the other data words are standardized in such a way that solely fractional numbers, having a quantity which is less than one, are allowed, while in the exemplary embodiment of FIG. 1 only integers are allowed as data words. The value of the input data word E, for instance, represents the discretized amplitudes of an analog signal at the various sampling times. The input data word E is thereupon read out serially by shifting to the right. The places that become free are then each filled with the algebraic sign by means of a sign repetition device SR4, as already described for FIG. 1. The serially read-out input data word E is supplied on one hand to a chain of five delay elements DL3–DL7 and on the other hand to one input of an adder unit ADU1, having another input which is connected to an output of a feedback shift register FS2. This is done under clock control, which has not been shown in the present exemplary embodiment, in the same way that the setting of the initial condition has likewise not been shown, since these functions are in principle identical with those shown in FIG. 1. The adder unit ADU1, like two further adder units ADU2 and ADU3, each include one full adder and one memory element, which are wired to one another in the manner shown in FIG. 1. In addition, two subtractors SUB1 and SUB2 are provided, each of which includes a full adder, a register and an inverter, in a structure which is likewise clear from FIG. 1.

An output of the adder unit ADU1 is carried first to a chain of five delay elements DL8–DL12 and second to one input of the adder device ADU3, which has another input that is connected to an output of the delay element DL9. An output of the adder unit ADU3 in turn is coupled to a non-inverting input of the subtractor SUB1, which has an inverting input that is connected to an output of the delay element DL11 and an output which is carried to one input of the adder unit ADU2. Another input of the adder unit ADU2 is connected to an output of the delay element DL7. An output of the adder unit ADU2 carries a data word G corresponding to the signal $b_2$ and is connected to a non-inverting input of the subtractor SUB2 and to one input of a multiplexer MX, having another input which is connected to the output of another sign repetition device SR5 assigned to the feedback shift register FS2. An output of the multiplexer MX is coupled to the input of the feedback shift register FS2, and an output of the delay element DL12 is coupled to an inverting input of the subtractor SUB2. An output shift register OS3 is connected to an output of the subtractor SUB2. The adder units ADU1, ADU2 and ADU3, the subtractors SUB1 and SUB2, and the delay elements DL1–DL12 form an arithmetic unit AU2.

In the multiplication by the constant factor $a$ to be carried out in the arithmetic unit AU2, the assumption is a sum of fractional numbers, each of which are powers of two, resulting in the factor $a$. This is expressed as follows:

$$a = -0.34375 = -\tfrac{1}{2} + \tfrac{1}{8} + 1/32.$$

In order to perform multiplication by one-half, one delay element is needed, and for multiplication by one-eighth and one thirty-second, three and five delay elements are respectively needed. These effect an overall shift of the data word to the right by 1, 3 and 5 places, respectively. In the present exemplary embodiment, the chain of delay elements DL8–DL12 with corresponding pickups is provided for this purpose, while the chain of delay elements DL3–DL7 is used for equalizing the transit time.

Connected to the output of the subtractor SUB2 is the output shift register OS3, into which an output data word F corresponding to the first output signal $-b_1$ is written serially by shifting to the right. Once the output data word F has been completely written in the output shift register OS3, it is read out in parallel and delivered to a saturation and offset monitor SO. This monitor passes on the output data word F unchanged, if the displayable value region has been adhered to, or it sets the output data word F to a maximum value, maintaining the same sign, and passes it on whenever the displayable value region is exceeded. In order to ascertain an overflow, an additional place between the sign place and the place for the most significant bit is used and it is retrieved continuously. However, only the top 16 bits are passed on by the saturation and offset monitor SO, so that as a result the output word length is then equal to the input word length again.

In the present exemplary embodiment, the input word length is 16 bits. The input shift register IS3 therefore has the same length. In contrast, both the feedback shift register FS2 and the output shift register OS3 have a length of 17 bits. The feedback shift register FS2 should be dimensioned in such a way that a delay by one sampled value is attained. If the length of the written in data word is shorter than the length of the feedback shift register, then the free places are written in continuously with the appropriate sign by the sign repetition device SR5. However, in the illustrated exemplary embodiment, the word length is equal to 21 bits. When the output data word F is written in the output shift register OS3, four bits are therefore not taken into account, namely the four least significant bits. In other words, in the writing process, these bits are shifted out of the shift register. The 17 bits of the output shift register OS3 include one bit for ascertaining an overflow by the following saturation and offset monitor SO. However, when the data word G having a 21-bit length is written in the feedback shift register FS2 having a 17-bit length, the procedure is different, because this shift register is simultaneously being read out as well. Upon the writing of the four least significant bits, the input of the feedback shift register FS2 is imposed by means of the multiplexer MX upon the sign repetition device SR5, which continuously generates and shifts onward, not the four least significant bits of the current data word G output by the adder unit but ADU2, but instead the algebraic sign of the previous data word G located in the feedback shift register FS2. Subsequently, the multiplexer MX releases the current data word G for the feedback shift register FS2.

The mode of operation of a circuit configuration according to the invention is based substantially on a type of data processing that is referred to below as the burst-serial method. This means that at a certain sampling rate, or in other words always at certain sampling times, input data words are written in a circuit configuration according to the invention and are subsequently processed by it serially under clock control. The clock rate is selected to be sufficiently higher than the sampling rate so that before the next sampling time, the result of the processing is read out as an output data word and the circuit configuration is returned to the defined initial state. The advantage in this case is that on one hand the sampling rate and the clock rate, except for the aforementioned condition, are entirely independent of one another, and that on the other hand the circuitry expenditure for flow controls and control units is extremely low. As can be seen from FIG. 1, this kind of control unit CU may, for instance, merely include a counter, which counts out the cycles of the clock signal CLK, and once the number of cycles required for complete processing as a result has been attained, it causes the readout of the output data word C by means of the signal RD and subsequently establishes the defined initial state by means of the signal INT. The counter can simultaneously be used to control the multiplexer MX, by providing for the counter to pick up a control signal at a suitable point. It is also advantageous that the circuit configuration according to the invention can be used at no additional expense several times for calculations between two sampling times, or in other words for it to be highly suitable for use in the time multiplexing mode. All that needs to be done is for the clock rate to be increased accordingly and a new data word to be written each time. This makes for uniform utilization of the circuit configuration, which in turn means a more uniform current consumption and therefore an avoidance of current peaks, which are features that are especially advantageous for large scale integrated circuits. In contrast, if the sampling rate is reduced, a corresponding number of bursts merely need be read out. In other words, with a reduction to 1/x, only every xth data word is written into the applicable input shift register.

The way in which the arithmetic unit is constructed depends on the particular application and is based substantially on the operations of addition, subtraction and delay. In these operations, the data word length increases, and specifically in the case of delay it increases by the same number of places as there are delay elements in the applicable data path, and in addition and subtraction it increases by the next larger integer of the dual logarithm of the number of additions and subtractions in the applicable data path. In circuit configurations having a plurality of output data words, the least favorable data path in each case should be taken into account, especially to determine the end of a calculation. Consequently, according to a feature of the invention, the feedback shift registers and the output shift registers assigned thereto are lengthened enough to ensure that the applicable data word can be written fully, even in the least favorable case. An essential feature in this case is that shortening of the word length is not performed at all, or at least not until the output data word representing the result is present. In other words, the length of data words within the arithmetic unit or in the case of feedbacks is not shortened. Major economics in control units are attained at only slight additional expense for the shift registers. As can be seen from FIG. 1, no additional circuitry expenditure for control units is necessary to achieve this. The maximum necessary number of sign repetition devices is equal to the number of input shift registers and feedback shift registers.

If small errors in calculation are tolerable, then the most recently present state can be established as the defined initial condition. In other words, the establishment of a defined initial condition can be dispensed with entirely. In closing it should be noted that a pipeline mode when an additional pipeline register is used and cascading of a plurality of circuit configurations according to the invention is naturally possible. Output shift registers along with a suitable sign repetition device can be used as input shift registers of a subsequent configuration. In complex data apparatus, further reduction in expenditure is possible as a result.

We claim:

1. A circuit configuration for digital bit-serial signal processing, comprising:

n input shift registers each being written in parallel or serially with an input data word and then read out by shifting to the right, sign repetition devices each being assigned to a respective one of said input shift registers for continuously generating and shifting an algebraic sign of the input data word onward in the shift to the right;

a serial arithmetic unit connected downstream of said input shift registers for serially outputting output data words;

m output shift registers connected downstream of said serial arithmetic unit being written in serially with the output data words;

a control unit connected to said serial arithmetic unit, once all of the output data words have been fully written in said respective output shift registers, said control unit ending a reading of said input shift registers and the writing in of said output shift registers, for resetting said arithmetic unit to a defined initial state, and for enabling said input shift registers for writing in new input data words;

k feedback shift registers each being written-in in parallel with data words stored in said output shift registers and being read out serially for a further transmission of the data word to said arithmetic unit, said feedback shift register having a length at least as long as the longest occurring data word; and other sign repetition devices assigned to said feedback shift registers for continuously generating and shifting the algebraic sign of the data words onward.

2. The circuit configuration according to claim 1, wherein the writing in and reading out of said feedback shift registers is effected synchronously with the writing in and reading out of said input shift registers.

3. The circuit configuration according to claim 1, wherein said feedback shift registers and said output shift registers are lengthened by at least one bit for overflow monitoring.

4. The circuit configuration according to claim 1, wherein said arithmetic unit has at least one full adder to which data words are input serially and from which data words are output serially, said at least one full adder having a transmission output and a transmission input, and including a register coupling the transmission output and transmission input of said full adder to one another, said register having an input side occupied by a logical zero at the defined initial state.

5. The circuit configuration according to claim 1, wherein said arithmetic unit has at least one full adder to which data words are input serially and from which data words are output serially, said at least one full adder having an input, a transmission output and a transmission input, and including an inverter connected upstream of the input of said at least one full adder, and a register coupling the transmission output and the transmission input of said at least one full adder to one another, said register having an input side being occupied by a logical one at a defined initial state.

6. The circuit configuration according to claim 1, wherein said arithmetic unit has at least one full adder with inputs, and including at least one delay element coupling one of the inputs to another of the inputs of said at least one full adder.

7. The circuit configuration according to claim 1, including a monitoring device connected to said output shift registers for checking the output data word as to whether a given values region has been adhered to, for passing on the output data word if the values region is adhered to, and for setting the output data word to a maximum value maintaining the same algebraic sign if the values region is not adhered to.

8. The circuit configuration according to claim 7, wherein the length of the output data word is shortened by said monitoring device.

9. A circuit configuration for digital bit-serial signal processing, comprising:

n input shift registers each being written in parallel or serially with an input data word and then read out by shifting to the right.

sign repetition devices each being assigned to a respective one of said input shift registers for continuously generating and shifting an algebraic sign of the input data word onward in the shift to the right;

a serial arithmetic unit connected downstream of said input shift registers for serially outputting output data words;

m output shift registers connected downstream of said serial arithmetic unit being written in serially with the output data words;

a control unit connected to said serial arithmetic unit, once all of the output data words have been fully written in said respective output shift registers, said control unit ending a reading of said input shift registers and the writing in of said output shift registers, for resetting said arithmetic unit to a defined initial state, and for enabling said input shift registers for writing in new input data words;

feedback shift registers into which data words being transferred from said arithmetic unit and supplied back to said arithmetic unit are written in serially by shifting to the right and simultaneously read out, said feedback shift registers each having a length at least as long as the longest occurring data word; and other sign repetition devices assigned to said feedback shift registers, and a multiplexer connected upstream of said feedback shift registers being imposed upon said other sign repetition devices and subsequently upon said arithmetic unit, upon writing in of said respective feedback shift registers for a certain number of least significant bits of the data words to be transferred, and signs generated and shifted onward by said other sign repetition devices being equal to signs of the data words to be read out.

10. The circuit configuration according to claim 9, wherein the reading out of said feedback shift registers is effected in synchronism with the reading out of said input shift register.

11. The circuit configuration according to claim 9, wherein said feedback shift registers and said output shift registers are lengthened by at least one bit for overflow monitoring.

12. The circuit configuration according to claim 9, wherein all of the places of said feedback shift register are set equal to zero at the defined initial state.

* * * * *